(12) United States Patent
Tseng et al.

(10) Patent No.: US 9,386,517 B2
(45) Date of Patent: Jul. 5, 2016

(54) ENERGY EFFICIENT NETWORK COMMUNICATION DEVICE AND METHOD

(71) Applicant: REALTEK SEMICONDUCTOR CORPORATION, Hsinchu (TW)

(72) Inventors: Ta-Chin Tseng, New Taipei (TW); Shieh-Hsing Kuo, Hsinchu (TW); Liang-Wei Huang, Hsinchu (TW); Heng Cheong Lao, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 394 days.

(21) Appl. No.: 14/044,540

(22) Filed: Oct. 2, 2013

(65) Prior Publication Data

US 2014/0126444 A1 May 8, 2014

(30) Foreign Application Priority Data

Nov. 8, 2012 (TW) .............................. 101141481 A
Feb. 19, 2013 (TW) .............................. 102105778 A

(51) Int. Cl.
*H04W 52/02* (2009.01)
*H04L 12/12* (2006.01)
(Continued)

(52) U.S. Cl.
CPC ......... *H04W 52/0203* (2013.01); *G06F 1/3209* (2013.01); *G06F 1/3278* (2013.01); *G06F 1/3287* (2013.01); *H04L 12/12* (2013.01);
(Continued)

(58) Field of Classification Search
CPC .......... H04W 52/0203; H04L 63/0485; H04L 63/0428; H04L 12/12; H04L 63/162; G06F 1/3209; G06F 1/3287; G06F 1/3278; Y02B 60/1282; Y02B 60/126; Y02B 60/32; Y02B 60/34
See application file for complete search history.

(56) References Cited

U.S. PATENT DOCUMENTS 8,259,716 B2 * 9/2012 Diab ....................... H04L 12/12
370/389
8,788,862 B1 * 7/2014 Vijayaraghavan .... G06F 1/3278
713/300

(Continued)

OTHER PUBLICATIONS

European Search Report for counterpart European application 13191841.9 dated Mar. 3, 2014.
(Continued)

*Primary Examiner* — Matthew Smithers
(74) *Attorney, Agent, or Firm* — WPAT, P.C., Intellectual Property Attorneys; Anthony King

(57) ABSTRACT

The present invention discloses an energy efficient network communication device comprising: a media-access-controller for outputting a transmission-end low power idle (LPI) indication and receiving a reception-end LPI indication; a media-independent-interface for generating a transmission-end LPI signal according to the transmission-end LPI indication, and generating the reception-end LPI indication according to a reception-end LPI signal; and a physical-layer-circuit, coupled to several pairs of transmission lines, for converting the transmission-end LPI signal into a transmission signal to send it to a reception end for requesting an LPI mode and receiving a reception signal from the reception end to convert it into the reception-end LPI signal. Said physical-layer-circuit uses some of the several pairs of transmission lines for transmission and reception when keeping the other pairs of transmission lines unused to save power; furthermore, the physical-layer-circuit can enter the LPI mode from an idle mode for additional power saving.

21 Claims, 10 Drawing Sheets

(51) Int. Cl.
*G06F 1/32* (2006.01)
*H04L 29/06* (2006.01)

(52) U.S. Cl.
CPC ........ *H04L63/0428* (2013.01); *H04L 63/0485* (2013.01); *H04L 63/162* (2013.01); *Y02B 60/126* (2013.01); *Y02B 60/1282* (2013.01); *Y02B 60/32* (2013.01); *Y02B 60/34* (2013.01)

(56) References Cited

U.S. PATENT DOCUMENTS

| | | | | |
|---|---|---|---|---|
| 2009/0201837 A1* | 8/2009 | Diab | ...................... | H04L 12/12 370/276 |
| 2009/0204828 A1* | 8/2009 | Diab | ...................... | H04L 12/10 713/320 |
| 2010/0115306 A1* | 5/2010 | Diab | ...................... | H04L 12/12 713/320 |
| 2010/0309816 A1* | 12/2010 | Diab | ...................... | H04L 12/10 370/254 |
| 2014/0043954 A1* | 2/2014 | Wang | ...................... | H04B 3/32 370/201 |

OTHER PUBLICATIONS

"IEEE Standard for Information technology—Telecommunications and information exchange between systems—Local and metropolitan area networks—Specific requirements Part 3: Carrier Sense Multiple Access with Collision Detection (CSMA/CD) Access Method and Physical Layer Specifications Amendment 5: Med", IEEE Standard, IEEE, Oct. 27, 2010, pp. 1-302.

Anonymous, "Category 5 cable—Wikipedia, the free encyclopedia", Dec. 29, 2009.

* cited by examiner

ENERGY EFFICIENT NETWORK COMMUNICATION DEVICE AND METHOD

BACKGROUND OF THE INVENTION

1. Field of the Invention

The present invention relates to a network communication device and a network communication method, especially to a network communication device and a network communication method capable of power saving.

2. Description of Related Art

In the prior art, after a network connection is established, a traditional network device (e.g. an Ethernet network device in compliance with 1000BASE-T standard) has to send an idle pattern to a reception end continually to thereby keep the connection alive even if the network device is in an idle state with no need to do transmission or reception. Unfortunately, although the idle state is applied, the power consumption of the traditional network device is merely a bit less than that in a normal state. Therefore, in order to save more power, IEEE works out Energy Efficient Ethernet (EEE) standard which allows a network device to enter a low power idle (LPI) mode from the aforementioned idle sate to turn off the operation of a physical layer circuit in the network device under the LPI mode. In the meantime, EEE standard also requires that the network device must come back from the LPI mode to the normal state immediately to process data once a transmission or reception request occurs.

Generally speaking, an Ethernet network device conforming to 1000 BASE-T standard utilizes four pairs of wires to carry out full-duplex transmission. However, a (U.S. Pat. No. 7,835,389B2) provides a framework in compliance with 100 BASE-T standard for performing transmission by only one pair or two pairs of wires. This framework has a data transmission rate higher than that of a traditional device conforming to 1000 BASE-X standard, but it also brings much circuit complication and power consumption issues; moreover, this framework can not support EEE standard, which means that it can not enter the LPI mode to cut the operation of the physical layer circuit for power saving.

SUMMARY OF THE INVENTION

In consideration of the deficits of the prior art, a purpose of the present invention is to provide an energy efficient network communication device and an energy efficient network communication method for making an improvement.

Another purpose of the present invention is to provide an energy efficient network communication device and an energy efficient network communication method for merely using partial transmission lines to carry out transmission and reception when keeping the other transmission lines unused, so as to accomplish an energy efficient function.

The present invention discloses an energy efficient network communication device. According to an embodiment of the present invention, the energy efficient network communication device comprises: a media access controller for outputting a transmission-end low power idle indication (TX-LPI indication) and receiving a reception-end low power idle indication (RX-LPI indication); a media independent interface including a media independent transmission interface and a media independent reception interface in which the media independent transmission interface is for generating a transmission-end low power idle signal (TX-LPI signal) according to the TX-LPI indication while the media independent reception interface is for generating the RX-LPI indication according to a reception-end low power idle signal (RX-LPI signal); and a physical layer circuit, electrically coupled to the media independent interface and several pairs of transmission lines, including a physical layer transmission circuit and a physical layer reception circuit in which the physical layer transmission circuit is coupled to the media independent transmission interface for converting the TX-LPI signal into a transmission signal and sending the transmission signal to a reception end to thereby ask the reception end to enter a low power idle mode (LPI mode) while the physical layer reception circuit is coupled to the media independent reception interface for receiving a reception signal from the reception end and converting the reception signal into the RX-LPI signal, wherein the physical layer circuit uses at least one of the several pairs of transmission lines for sending the transmission signal and receiving the reception signal, and keeps at least another one of the several pairs of transmission lines unused, and after sending the transmission signal and/or receiving the RX-LPI signal, the physical layer circuit enters the LPI mode from an idle mode and stops the operation of some or all of the physical layer circuit to reduce power consumption.

The present invention also discloses an energy efficient network communication method which could be carried out by an energy efficient network communication device. According to an embodiment of the present invention, the energy efficient network communication method comprises the following steps: entering an idle mode from a normal mode; generating a transmission-end lower power idle indication (TX-LPI indication); generating a transmission-end lower power idle signal (TX-LPI signal) according to the TX-LPI indication; converting the TX-LPI signal into a transmission signal; using at least one of several pairs of transmission lines to output the transmission signal to a reception end for asking the reception end to enter a lower power idle mode (LPI mode), and keeping at least another one of the several pairs of transmission lines unused; using the at least one of the several pairs of transmission lines to receive a reception signal from the reception end, and keeping the at least another one of the several pairs of transmission lines unused; converting the reception signal into a reception-end low power idle signal (RX-LPI signal); and after outputting the transmission signal and/or receiving the RX-LPI signal, entering the LPI mode from the idle mode for reducing power consumption, wherein the power consumption under the normal mode is higher than the power consumption under the idle mode while the power consumption under the idle mode is higher than the power consumption under the LPI mode.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

Figure 1:
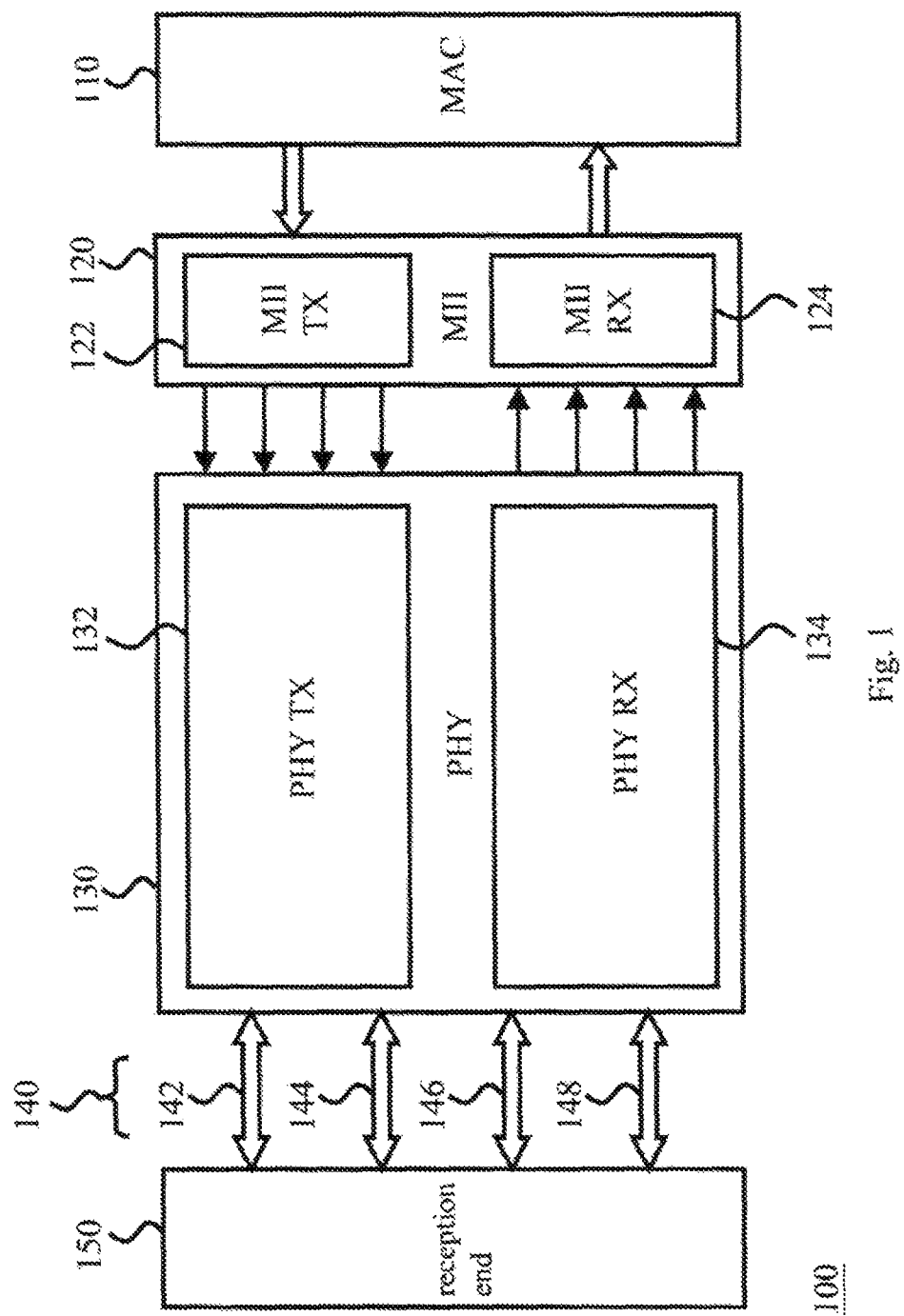
FIG. 1 illustrates an embodiment of the energy efficient network communication device of the present invention.

The following description uses language by referring to terms of the filed of this invention. If any term is defined in the specification, such term should be explained accordingly. Besides, the connection between objects or events in the disclosed embodiments can be direct or indirect provided that these embodiments are still applicable under such connection. The mentioned "indirect" means that an intermediate object or a physical space is existed between the objects, or an intermediate event or a time interval is existed between the events. In addition, the following description relates to network communication, and thus the known detail in this filed will be omitted if such detail has little to do with the features of the present invention. Furthermore, the shape, size, and ratio of any element and the step sequence of any flow chart in the disclosed figures are just exemplary for understanding, not for limiting the scope of this invention.

Besides, each embodiment in the following description includes one or more features; however, this doesn't mean that one carrying out the present invention should make use of all the features of one embodiment at the same time, or should only carry out different embodiments separately. In other words, if an implementation derived from one or more of the embodiments is applicable, a person of ordinary skill in the art can selectively make use of some or all of the features in one embodiment or selectively make use of the combination of some or all features in several embodiments to have the implementation come true, so as to increase the flexibility of carrying out the present invention.

The present invention discloses an energy efficient network communication device and an energy efficient network communication method. The energy efficient network communication device and method are capable of transmitting and receiving data with a part of several pairs of transmission lines while the other part of the several pairs of transmission lines remains unused; furthermore, the device and method can enter a low power idle (LPI) mode for power saving. In the following embodiments, the network communication device and method support or comply with IEEE Ethernet network standards (i.e. 802.3 standard series), and support or conform to energy efficient Ethernet (EEE) standard. Provided that an implementation is applicable, people of ordinary skill in the art can choose components or steps equivalent to those described in this specification to realize the present invention, which means that the scope of this invention is not limited to the embodiments in the specification. Besides, since some or all elements of the network communication device of the present invention could be known; therefore, detail of such elements will be omitted provided that the omission nowhere dissatisfies the specification and enablement requirements. On the other hand, the network communication method can be carried out by the network communication device of this invention or the equivalent device thereof; likewise the following description will abridge the hardware details or well-known parts of the method provided that the disclosure still satisfies the specification and enablement requirements.

Please refer to FIG. 1 which illustrates an embodiment of the energy efficient network communication device of the present invention. This embodiment could be an Ethernet network communication device such as the Ethernet network communication device conforming to or supporting 1000 BASE-T (IEEE 802.3ab) standard, and is able to comply with or support the standard or concept of energy efficient Ethernet (EEE). As shown in FIG. 1, the energy efficient network communication device 100 of this embodiment comprises: a media access controller (MAC) 110 for outputting a transmission-end low power idle indication (TX-LPI indication) and receiving a reception-end low power idle indication (RX-LPI indication); a media independent interface (MII) 120, coupled to the MAC 110, including a media independent transmission interface (MII TX) 122 and a media independent reception interface (MII RX) 124 in which the media independent transmission interface 122 is for generating a transmission-end low power idle signal (TX-LPI signal) according to the TX-LPI indication while the media independent reception interface 124 is for generating the RX-LPI indication according to a reception-end low power idle signal (RX-LPI signal); and a physical layer circuit (PHY), electrically coupled to the media independent interface 120 and several pairs of transmission lines 140 (e.g. the Cat-5, Cat-5e, Cat-6 or Cat-7 twisted pair cable). An embodiment of the several pairs of transmission lines 140 includes a first pair of transmission lines 142, a second pair of transmission lines 144, a third pair of transmission lines 146 and a fourth pair of transmission lines 148; meanwhile, the physical layer circuit 130 includes a physical layer transmission circuit (PHY TX) 132 and a physical layer reception circuit (PHY RX) 134 in which the physical layer transmission circuit 132 is coupled to the aforementioned media independent transmission interface 122 for converting the TX-LPI signal into a transmission signal (e.g. a pulse amplitude modulation (PAM) signal) and sending the transmission signal to a reception end 150 through at least one of the several pairs of transmission lines 140 (e.g. the first pair of transmission lines 142 and/or the second pair of transmission lines 144), so as to ask the reception end 150 to enter a low power idle mode (LPI mode); on the other side, the physical layer reception circuit 134 is coupled to the aforementioned media independent reception interface 124 for receiving a reception signal from the reception end 150 through the mentioned at least one pair of transmission lines (i.e. the first pair and/or the second pair of transmission lines 142, 144) and converting the reception signal into the RX-LPI signal. The above-mentioned physical layer circuit 130 not only uses the at least one pair of transmission lines to execute transmission and reception, but also keeps at least another pair of the several pairs of transmission lines 140 (e.g. the aforementioned third pair of transmission lines 146 and/or the fourth pair of transmission lines 148) unused, so as to reduce power consumption. Additionally, after outputting the transmission signal derived from the TX-LPI indication and/or receiving the RX-LPI signal, the physical layer circuit 130 will enter the LPI mode from an idle mode and stop the operation of at least some of its own circuits for more power saving.

In accordance with the above description, when the physical layer circuit 130 uses two pairs of transmission lines for transmission and reception, the symbol rate thereof will be less than that of the condition using only one pair of transmission lines. For example, if the network communication device 100 of the present invention uses two pairs of transmission lines for transmission at the rate of 100 Mb/s per pair (that is to say the total rate equal to 200 Mb/s) while the physical layer circuit 130 converts the signal from the media independent transmission interface 122 into two sets of transmission signals TA, TB in a 3-bits format for output (which means that the two sets of transmission signals TA, TB are delivered by the two pairs of transmission lines respectively), the corresponding symbol rate per pair is {2×100 (Mb/s)}/{2×3 (bit)}=33.3 Mhz; however, if the network communication device 100 merely uses one pair of transmission lines for transmission at the same total rate 200 Mb/s (which means that all transmission signal is delivered by the only one pair of transmission lines), the corresponding symbol rate per pair will be {2×100 (Mb/s)}/{3 (bit)}=66.6 Mhz. Please note that before the network communication device 100 of this embodiment issues the LPI indication, it enters an idle mode from a normal mode first; thereafter, it sends the LPI indication and enters the LPI mode for power saving. The power consumption of the network communication device 100 is relatively highest under the normal mode, second highest under the idle mode, and lowest under the LPI mode; in other words, the power consumption of the normal mode is higher than that of the idle mode while the power consumption of the idle mode is higher than that of the LPI mode, wherein the normal mode and the idle mode support or conform to IEEE Ethernet network standards (i.e. 802.3 standards).

Figure 2:
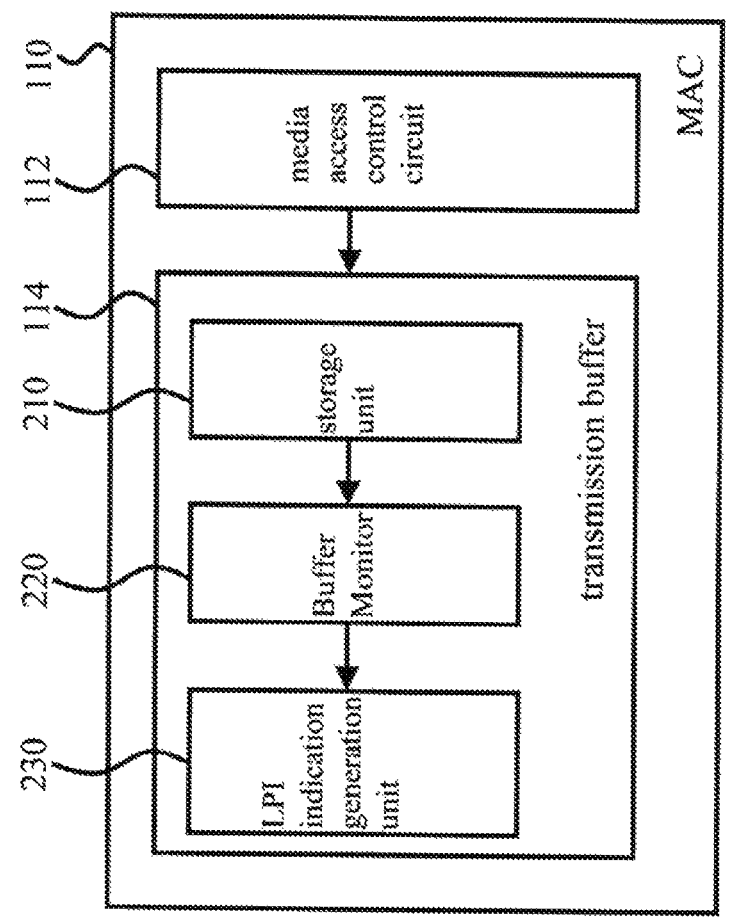
FIG. 2 illustrates an embodiment of the media access controller of FIG. 1.

Please refer to FIG. 1 and the above description. In the present embodiment, the media access controller 110 includes a media access control circuit (e.g. a media access control circuit supporting or in compliance with EEE (IEEE 802.3az) standard) for issuing the aforementioned TX-LPI indication, so as to ask the reception end 150 to enter the LPI mode. The media access control circuit can also receive the RX-LPI indication, and thereby determines whether to enter the LPI mode to shut down the operation of at least some circuits for power saving. However, in another embodiment of the present invention, the media access control circuit (e.g. a media access control circuit in compliance with 100 BASE-T (IEEE 802.3i) standard, but not in compliance with EEE standard) of the media access controller 110 is not capable of issuing the TX-LPI indication; in this case, the media access controller 110 of this invention will be configured with a transmission buffer which is coupled between the media access control circuit and the aforementioned media independent transmission interface 122 for outputting the TX-LPI indication according to a buffer capacity threshold after the media access control circuit stops sending packets. In other words, if the media access control circuit stops sending packets while the capacity of the transmission buffer reaches the mentioned buffer capacity threshold (which means that the transmission buffer is going to finish or has finished sending packets), the transmission buffer can then ask the reception end 150 to enter the LPI mode by issuing the TX-LPI indication. Please note that the aforementioned media access control circuit conforming to 100 BASE-T can receive the RX-LPI indication but can not or does not recognize the RX-LPI indication, which means that no power saving function will be executed by that indication. Besides, please refer to FIG. 2. An embodiment of the transmission buffer 114 includes: a storage unit 210, coupled to the media access control circuit 112, for storing delivery-awaited packets; a buffer capacity monitoring unit (Buffer Monitor) 220 for watching the capacity of the storage unit 210 according to the mentioned buffer capacity threshold, and outputting a notification signal if the capacity of the storage unit 210 reaches the buffer capacity threshold; and a low power idle indication generation unit (LPI indication generation unit) 230 for sending the TX-LPI indication according to the notification signal. More detail of the transmission buffer 114 could be found in the disclosure of Applicant's Taiwan patent application (Appl. Number: 098101499).

Please refer to FIG. 1 and the above description again. In the present embodiment, the signal outputted or received by the media independent interface 120 includes a plurality of bits. When the outputted bits have a set of predetermined values, they represent the aforementioned TX-LPI signal; when the received bits correspond to a set of preset values, they represent the RX-LPI signal. More specifically, the TX-LPI signal of this embodiment includes a first transmission bit (e.g. a transmission enablement bit, TX_EN), a second transmission bit (e.g. a transmission error bit, TX_ER) and a third transmission bit (e.g. a transmission data bit, TXD[3:0]). If the first, second and third transmission bits sequentially have a first predetermined value (e.g. 0), a second predetermined value (e.g. 1) and a third predetermined value (e.g. a hexadecimal value 0×1), they consequently act the TX-LPI signal. On the other hand, the RX-LPI signal includes a first reception bit (e.g. a reception data valid bit, RX_DV), a second reception bit (e.g. a reception error bit, RX_ER) and a third reception bit (e.g. a reception data bit, RXD[3:0]); if the first, second and third reception bits sequentially correspond to a first preset value (e.g. 0), a second preset value (e.g. 1) and a third preset value (e.g. a hexadecimal value 0×1), they consequently act the RX-LPI signal. Please note that in order to allow the transmission end and the reception end to recognize signals from each other, the first predetermined value is equal to the first preset value, the second predetermined value is equal to the second preset value, and the third predetermined value is equal to the third preset value. Please also note that the above description is for understanding, not for limiting the scope of the present invention. People of ordinary skill in the art can utilize an unused combination of bit values to represent the TX-LPI signal and/or the RX-LPI signal for carrying out the present invention according to the disclosure in this specification. In another word, the implementation scope of this invention embraces similar and equivalent modifications.

Figure 3:
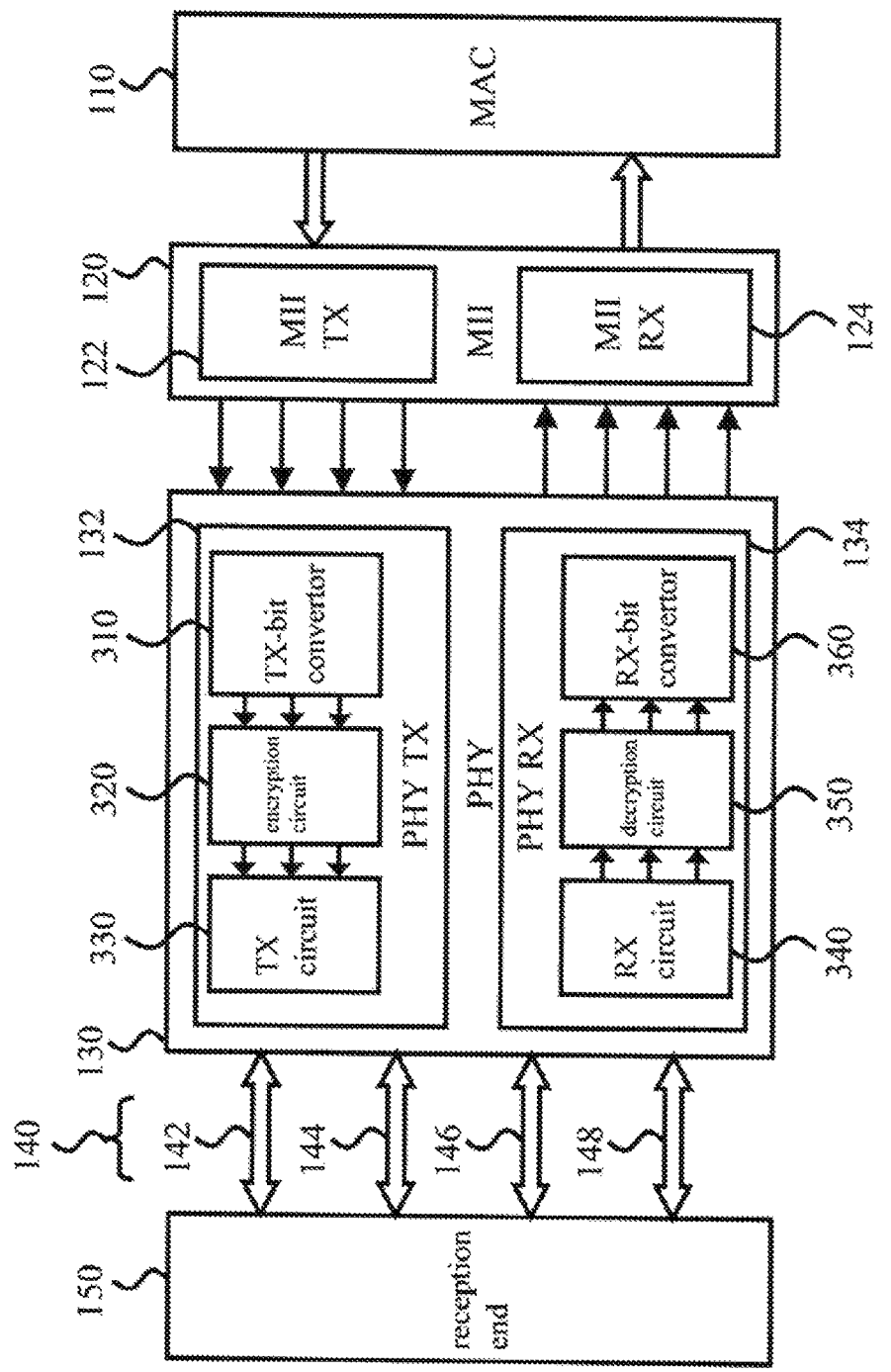
FIG. 3 illustrates an embodiment of the physical layer circuit of FIG. 1.

FIG. 3 illustrates an embodiment of the physical layer circuit 130 in FIG. 1. Please refer to FIG. 3 and the description in re FIG. 1. The physical layer transmission circuit 132 includes: a transmission-bit conversion circuit (TX-bit convertor) 310, coupled to the media independent transmission interface 122, for generating a transmission-bit conversion signal according to the TX-LPI signal in which the bit number (e.g. 4 bits) of the TX-LPI signal is not equal to the bit number (e.g. 3 bits) of the transmission-bit conversion signal. The physical layer transmission circuit 132 also includes: an encryption circuit 320 (e.g. a scrambling circuit), coupled to the transmission-bit conversion circuit 310, for generating a transmission-end encryption signal according to the transmission-bit conversion signal. More specifically, the encryption circuit 320 processes the transmission-bit conversion signal according to an encryption rule to thereby generate a plurality of transmission-end encryption bits which constitute the transmission-end encryption signal, wherein at least some of the transmission-end encryption bits go through a logic operation (e.g. an Exclusive-OR operation) to carry the information of the TX-LPI signal. For example, the plurality of transmission-end encryption bits includes a first transmission-end encryption bit (Sdn[0]), a second transmission-end encryption bit (Sdn[1]) and a third transmission-end encryption bit (Sdn[2]) to convey different information respectively in which the first transmission-end encryption bit is for conveying the information of the TX-LPI signal, the second transmission-end encryption bit is for conveying the information of a transmission-end update-completion indication (loc_update_done), and the third transmission-end encryption bit is for conveying the information of a transmission-end reception status (loc_rcvr_status). The physical layer transmission circuit 132 further includes: a transmission circuit (TX circuit) 330, electrically connected to the aforementioned several pairs of transmission lines 140, for generating the transmission signal according to the transmission-end encryption signal. Besides, once the physical layer circuit 130 enters the LPI mode, if the media access controller 110 is going to send packets, it can send a low power idle mode indication (LPI stop indication such as an indication other than the TX-LPI indication) to the physical layer circuit 130 through the media independent transmission interface 122; afterwards, the physical layer circuit 130 sends a wake-up signal to the reception end 150 in accordance with the LPI stop indication, so as to ask the reception end 150 to leave the LPI mode. The physical layer circuit 130 itself quits the LPI mode after receiving the LPI stop indication from the media access controller 110 and/or receiving a signal from the reception end 150 asking for leaving the LPI mode (i.e. stopping requesting to enter the LPI mode). Please note that if the media access controller 110 utilizes the transmission buffer 114 of FIG. 2 for issuing the TX-LPI signal, provided that the physical layer circuit 130 has entered the LPI mode, the transmission buffer 114 will take charge of sending the LPI stop indication to the physical layer circuit 130 through the media independent transmission interface 122 according to the aforementioned buffer capacity threshold after the media access control circuit 112 transmits packets again, which makes the physical layer circuit 130 send the wake-up signal to the reception end in light of the LPI stop indication to thereby ask the reception end 150 to leave the LPI mode.

On the other side, the physical layer reception circuit 134 of FIG. 3 includes: a reception circuit (RX circuit) 340, electrically connected to the several pairs of transmission lines 140, for generating a reception-end encryption signal according to the reception signal from the reception end 150. In this embodiment, the reception signal is two sets of reception signals RA, RB in a 3-bits format delivered through two pairs of transmission lines 140. The physical layer reception circuit 134 also includes: a decryption circuit 350 (e.g. a descrambling circuit), coupled to the reception circuit 340, for generating a reception-bit conversion signal according to the reception-end encryption signal. To be more specific, the decryption circuit 350 processes the reception-end encryption signal composed of a plurality of reception-end encryption bits according to a decryption rule (corresponding to an encryption rule of the reception end 150) to thereby generate the reception-bit conversion signal; furthermore, the decryption circuit 350 performs a comparison operation to at least some of the reception-end encryption bits to verify whether the above-mentioned decryption rule and encryption rule correspond to each other correctly and check whether the at least some of the reception-end encryption bits carries the information of the RX-LPI signal from the reception end 150. For instance, the plurality of reception-end encryption bits includes a first reception-end encryption bit (Sdn[0]), a second reception-end encryption bit (Sdn[1]) and a third reception-end encryption bit (Sdn[2]). The decryption circuit 350 compares the first reception-end encryption bit (Sdn[0]) with a first preset bit (Scrn[0]) to determine whether the decryption rule of the local end correctly corresponds to the encryption rule of the far end; moreover, the decryption circuit 350 compares a logic operation result (e.g. an inversion operation result obtained by performing an inversion operation to the first reception-end encryption bit) with a first preset operation-bit (Scr2n[0]) to determine whether the first reception-end encryption bit carries the information of the RX-LPI signal. In short, the decryption circuit 350 determines whether the local end is capable of correctly decrypting the signal from the far end and whether the far end asks for entering or leaving the LPI mode according to the results of comparison. The physical layer reception circuit 134 further includes a reception-bit conversion circuit (RX-bit convertor) 360, coupled to the decryption circuit 350 and the media independent reception interface 120, for generating the RX-LPI signal in accordance with the reception-bit conversion signal in which the bit number of the RX-LPI signal (e.g. 4 bits) is different from the bit number of the reception-bit conversion signal (e.g. 3 bits). Please note that in order to accelerate the connection establishment between the transmission end and reception end, the aforementioned decryption rule and encryption rule are therefore built-in; however, during establishing the connection, the two ends still need to confirm that the decryption sequence adopted by one end in compliance with the decryption rule is synchronous with the encryption sequence adopted by the other end in compliance with the encryption rule, so as to accurately receive the signal from the other side after the synchronization is verified and locked. After that, the connection is formally in effect, and the local end may send the TX-LPI signal or verify the RX-LPI signal from the reception end. The establishment of the above-mentioned connection and the synchronization verification of the decryption sequence will be further explained in the following description.

Figure 4A:
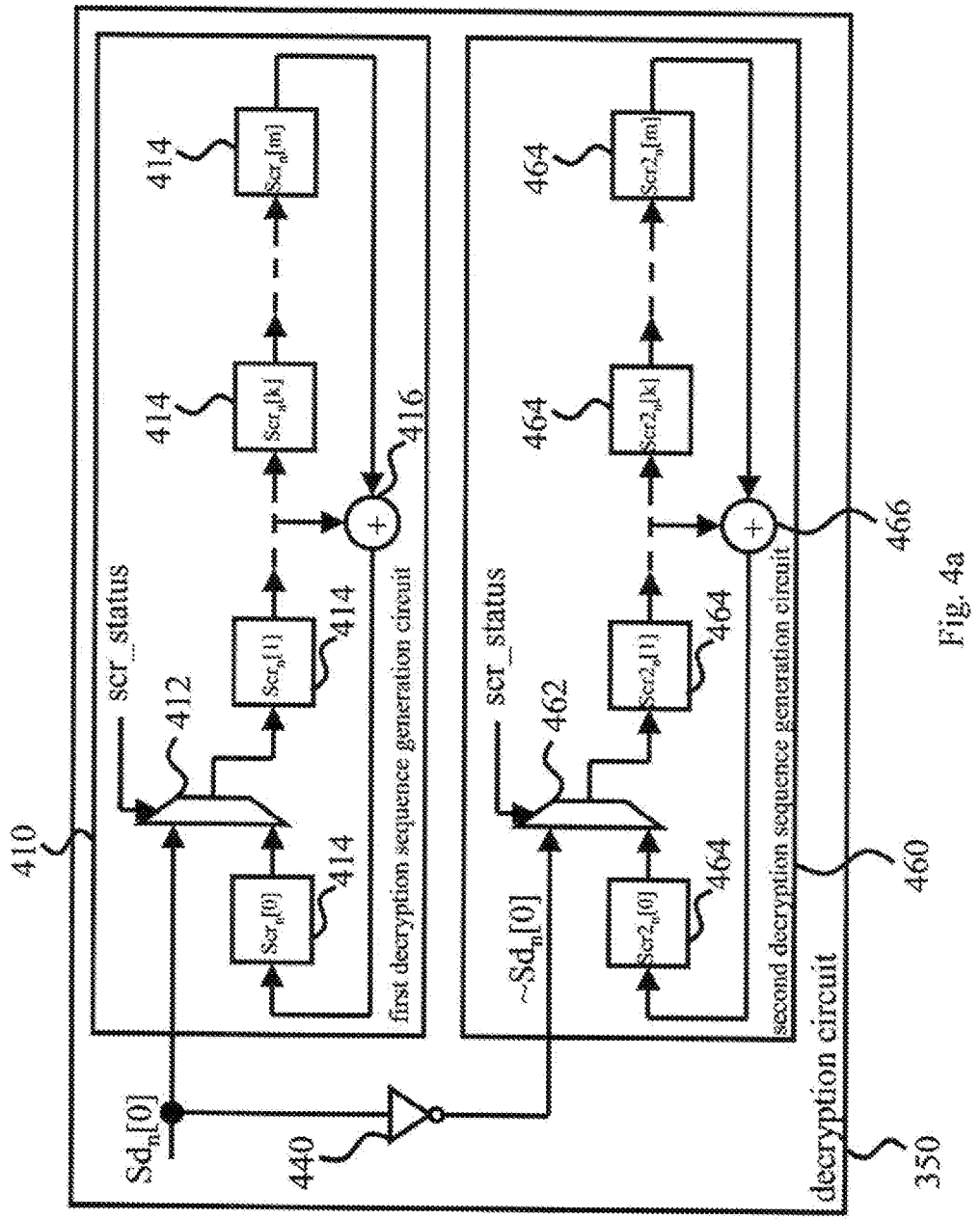
FIG. 4a and FIG. 4b illustrate an embodiment of the decryption circuit of FIG. 3.
Figure 4B:
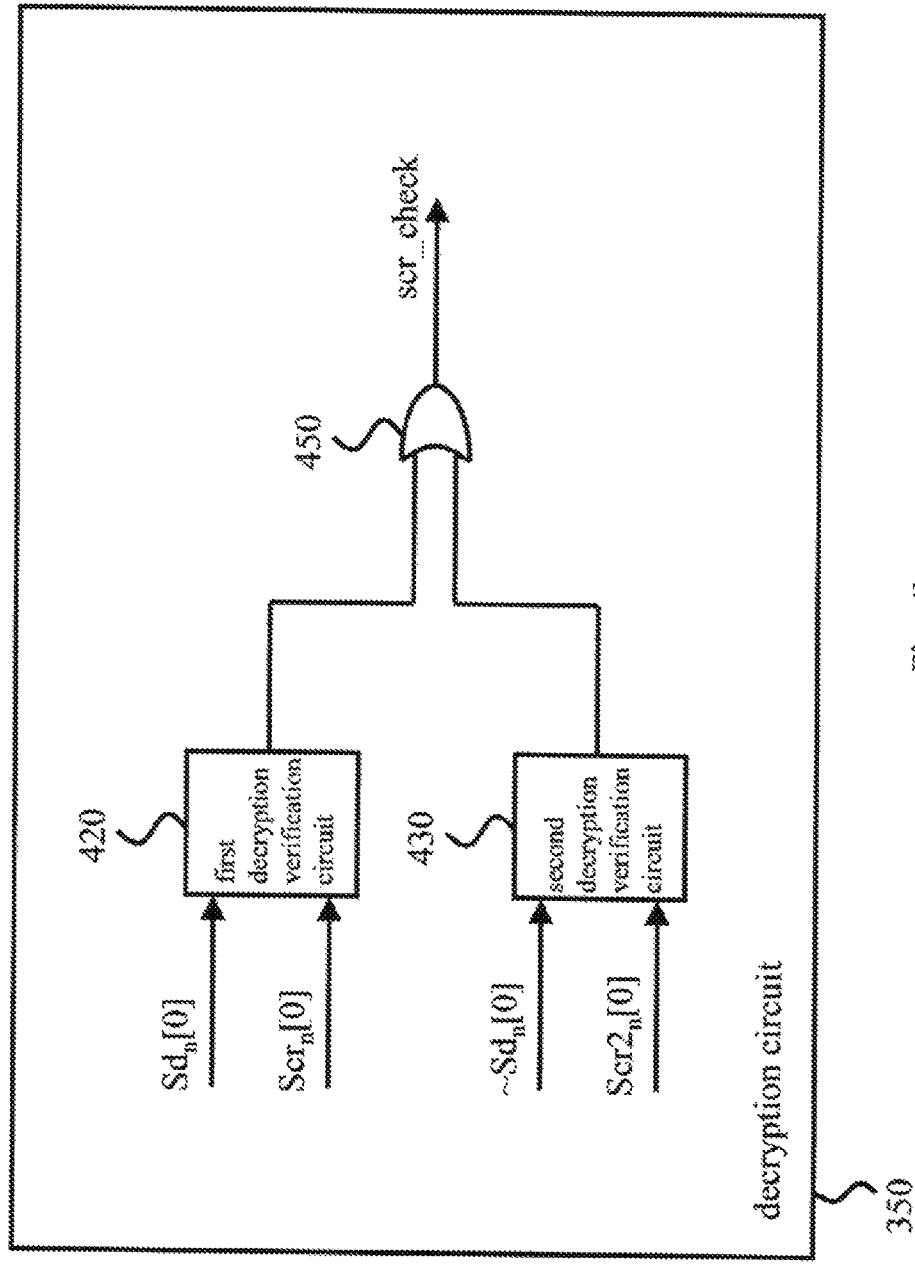

Please refer to FIG. 4a and FIG. 4b which illustrate an embodiment of the decryption circuit 350 of FIG. 3. As shown in FIG. 4a and FIG. 4b, the decryption circuit 350 includes: a first decryption sequence generation circuit 410 to establish the synchronization between the encryption sequence of the far end and the decryption sequence of the local end according to the first reception-end encryption bit (Sdn[0]), and stop using the first reception-end decryption bit (Sdn[0]) according to the level change (e.g. from level 0 to level 1) of a decryption status signal (scr_status) to thereby use a first decryption sequence (Scrn[0], Scrn[1] . . . Scrn[k] . . . Scrn[m−1], Scrn[m]) instead as the basis of generating the aforementioned reception-bit conversion signal, wherein the first decryption sequence is self-generated internally, and the first reception-end encryption bit (Sdn[0]) is generated by decoding the aforementioned reception signal according to a predetermined decoding rule. For example, if the level of the reception signal RA is 0, the first reception-end encryption bit (Sdn[0]) will be 1; if the level of the reception signal RA is not 0 (e.g. 1 or −1), the first reception-end encryption bit will be 0. Besides, the decryption circuit 350 also includes: a first decryption verification circuit 420 for generating a decryption verification signal (scr_check) according to the first reception-end encryption bit (Sdn[0]) and the aforementioned first preset bit (Scrn[0]). More specifically, if the first reception-end decryption bit (Sdn[0]) remains the same as the first preset bit (Scrn[0]) for a certain amount or time, the decryption verification signal (scr_check) then indicates that the synchronization is correct by changing its level (e.g. from level 0 to level 1), else the decryption verification signal (scr_check) indicates that the synchronization is incorrect; in the later case, the first decryption sequence generation circuit 410 will rebuild the synchronization according to the decryption status signal (scr_status). The decryption circuit 350 further includes: a second decryption verification circuit 430 for determining the level of the decryption verification signal (scr_check) according to the reversed first reception-end encryption bit (~Sdn[0]) and a first preset operation-bit (Scr2n[0]) after the synchronization is verified, so as to tell whether the synchronization remains correct or not, wherein the reversed bit could be generated by an inverter 440. To be more specific, because the reception end in a distant place may output the reversed first reception-end encryption bit (~Sdn[0]) to ask for the LPI mode after the synchronization is well-established, thus the embodiment should not only use the first decryption verification circuit 420 to compare the first reception-end encryption bit (Sdn[0]) with the first preset bit (Scrn[0]), but also use the second decryption verification circuit 430 to compare the reversed first reception-end encryption bit (~Sdn[0]) with the first preset operation-bit (Scr2n[0]). If any of the decryption verification signals (scr_check) from the decryption verification circuits 420, 430 through a logic OR gate 450 corresponds to a preset level (e.g. level 1), it means that the aforementioned synchronization remains correct. However, if both of the decryption verification signals (scr_check) from the two verification circuits 420, 430 fail to correspond the preset level while the fore-mentioned physical layer circuit 130 stays in a condition other than the LPI mode, it means that the synchronization has failed; in the mean time, the aforementioned decryption status signal (scr_status) will change its level and thereby control the first decryption sequence generation circuit 410 to rebuild the synchronization. Additionally, the decryption circuit 350 includes: a second decryption sequence generation circuit 460 to check the synchronization according to the reversed first reception-end encryption bit (~Sdn[0]) for the LPI mode after the synchronization is established. If the synchronization is verified, the second decryption sequence generation circuit 460 stops using the reversed first reception-end encryption bit (~Sdn[0]) according to the level change of the decryption status signal (scr_status), and uses a second decryption sequence (Scr2n[0], Scr2n[1] . . . Scr2n[k] . . . Scr2n[m−1], Scr2n[m]) generated internally instead, so that the second decryption sequence is used as the basis of generating the aforementioned reception-bit conversion signal. Please note that if the physical layer circuit 130 goes to the LPI mode, the level of the decryption status signal (scr_status) will change (e.g. from 1 to 0) due to some of the circuits of the physical layer circuits 130 inactive; meanwhile, the first and second decryption sequence generation circuits 410, 460 will simultaneously try to establish the synchronization separately according to the first reception-end encryption bit (Sdn[0]) and the reversed bit thereof (~Sdn[0]) by the aforementioned means; in other words, one of the first and second decryption sequence generation circuits 410, 460 is supposed to engage with the synchronization.

In the present embodiment, the level change of the decryption status signal (scr_status) is based on the comparisons between the reception-end encryption bits (Sdn[0], Sdn[1], Sdn[2]) and the preset bits (Scrn[0], Scrn[1], Scrn[2]) of the first decryption sequence in a predetermined duration. If the comparison result shows that the two groups of bits are consistent within the predetermined duration, the decryption status signal (scr_status) indicates that the synchronization is correct by setting its signal level (e.g. from level 0 to level 1); but if the comparison result shows that the two groups of bits fail to remain consistent within the predetermined duration, the decryption status signal (scr_status) then indicates that the synchronization is incorrect by setting its signal level (e.g. from level 1 to level 0). Moreover, the predetermined duration under the LPI mode could be shorter than that under the normal and idle modes, so as to reduce the response time under the LPI mode; however, this is merely exemplary, which means that people of ordinary skill in the art can set or adjust the predetermined duration by their requirement or design specification. Please note that since the comparison and level change techniques themselves are well-known in this field, a person of ordinary skill in the art can refer to the disclosure of the present invention to make an assembly of comparators, registers and logic gates or use a programmable logic circuit to carry out these techniques; hence, the background technical description is omitted here provided that the omission nowhere dissatisfies the specification and enablement requirements.

Please refer to FIG. 4*a*, FIG. 4*b* and the above-description again. The first decryption sequence generation circuit 410 comprises: a first selection unit 412 (e.g. a multiplexer) for outputting the first reception-end encryption bit (Sdn[0]) or the first preset bit (Scrn[0]) according to the decryption status signal (scr_status); and a first sequence generation unit includes a plurality of shift registers 414 and one or more calculation units 416 for producing the aforementioned first decryption sequence (Scrn[0], Scrn[1] . . . Scrn[k] . . . Scrn[m−1], Scrn[m]) according to the output of the first selection unit 412 in which the first decryption sequence is treated as the decryption basis after locking the fore-mentioned synchronization. On the other side, the second decryption sequence generation circuit 460 comprises: a second selection unit 462 (e.g. a multiplexer) for outputting the reversed first reception-end encryption bit (~Sdn[0]) or the first preset operation-bit (Scr2n[0]); and a second sequence generation unit including a plurality of shift registers 464 and one or more calculation units 466 for producing the aforementioned second decryption sequence (Scr2n[0], Scr2n[1] . . . Scr2n[k] . . . Scr2n[m−1], Scr2n[m]) according to the output of the second selection unit 462 in which the second decryption sequence is treated as the decryption basis after receiving the RX-LPI signal from the far end (i.e. reception end) and locking the synchronization under the LPI mode. Since the selection units 412, 462, shift registers 414, 464 and calculation units 416, 466 are well-know in this field individually, detail of these units will be omitted provided that the disclosure and enablement requirements remain eligible.

Figure 5:
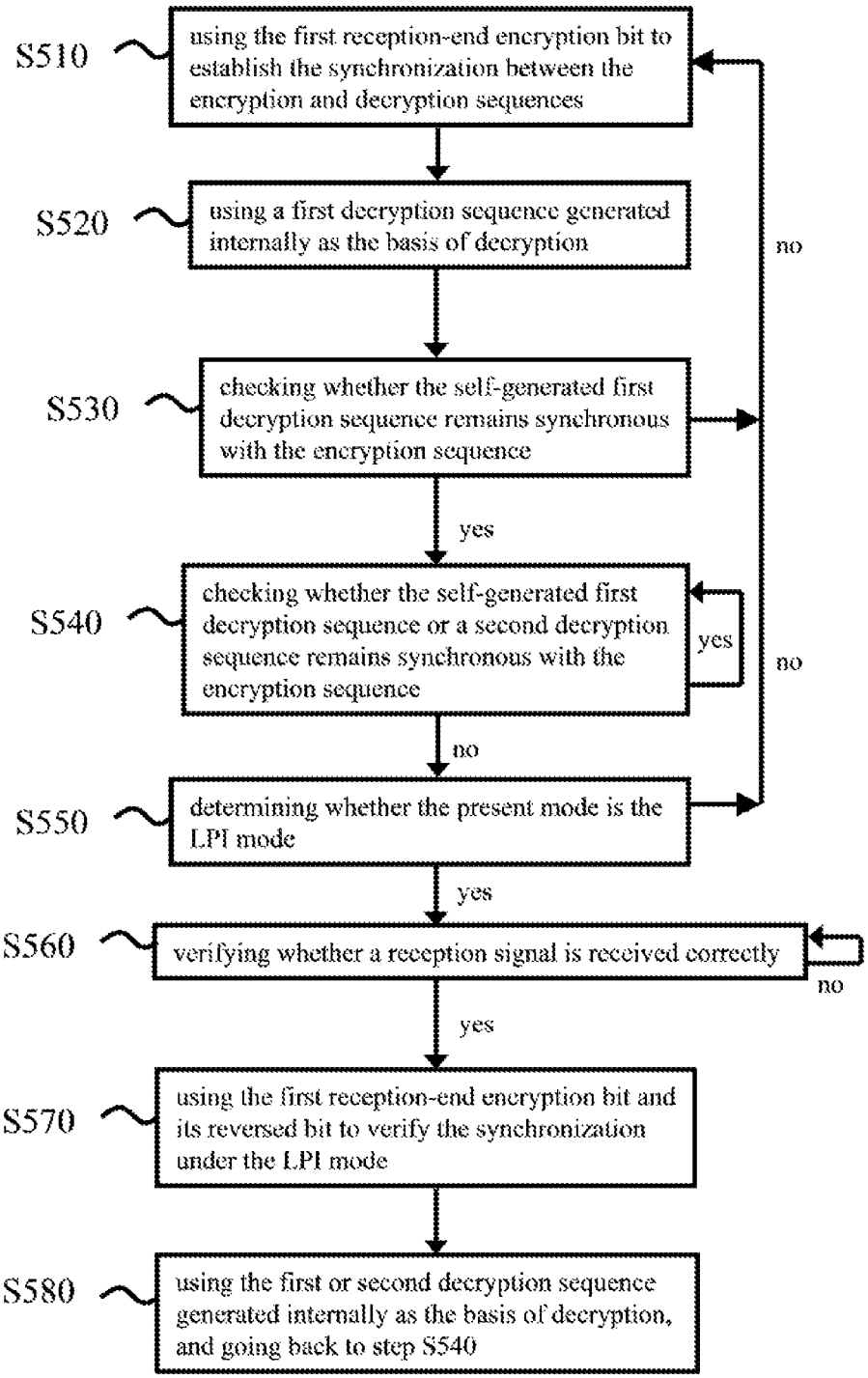
FIG. 5 illustrates an embodiment of the operation procedure of the decryption circuit of FIGS. 4a and 4b.

FIG. 5 illustrates an embodiment of the operation procedure of the decryption circuit 350 in FIG. 4*a* and FIG. 4*b*. Please refer to FIG. 5 and the above description. The operation procedure comprises:

Step S510: using the first reception-end encryption bit (Sdn[0]) to establish the synchronization between the encryption sequence of the far end (a.k.a. reception end) and the decryption sequence of the local end (a.k.a. transmission end). This step can be carried out by the aforementioned first decryption sequence generation circuit 410 and the first decryption verification circuit 420;

Step S520: using a first decryption sequence (Scrn[0], Scrn[1] . . . Scrn[k] . . . Scrn[m−1], Scrn[m]) generated internally as the basis of decryption. This step can be carried out by the first decryption sequence generation circuit 410;

Step S530: using the first reception-end encryption bit (Sdn[0]) to check whether the self-generated first decryption sequence remains synchronous with the encryption sequence. If so, go to step S540 or else go back to step S510. This step can be carried out by the first decryption sequence generation circuit 410 and the first decryption verification circuit 420;

Step S540: using the first reception-end encryption bit (Sdn[0]) and the reversed bit thereof (~Sdn[0]) to check whether the self-generated first decryption sequence or a second decryption sequence (Scr2n[0], Scr2n[1] . . . Scr2n[k] . . . Scr2n[m−1], Scr2n[m]) remains synchronous with the encryption sequence. If not, go to step S550 or else repeat step S540. This step can be carried out by the aforementioned first and second decryption verification circuits 420, 430;

Step S550: determining whether the present mode is the LPI mode. If so, go to step S560 or else go back to step S510;

Step S560: verifying whether a reception signal is received correctly. If so, go to step S570 or else repeat step S560;

Step S570: using the first reception-end encryption bit (Sdn [0]) and the reversed bit thereof (~Sdn[0]) to verify the synchronization under the LPI mode. This step can be carried out by the first and second decryption sequence generation circuits 410, 460 and the first and second decryption verification circuits 420, 430; and Step S580: using the first or second decryption sequence generated internally as the basis of decryption, and going back to step S540. This step can be carried out by the first decryption sequence generation circuit 410 or the second decryption sequence generation circuit 460.

Please note that people of ordinary skill in the art can modify any of the above-mentioned steps according to the disclosure of this specification and/or their demand or design rules with due diligence. For instance: one can add decision terms to any of the steps to thereby modify the execution timing of said step, modify parameters taken by any of the steps to therefore adjust the execution effect of such step, ignore any of the steps if such step is unnecessary, or set new conditions to change the relation between the steps. In sum, the decryption circuit 350 can carry out equivalent or modified steps derived from the fore-mentioned operation procedure.

Figure 6:
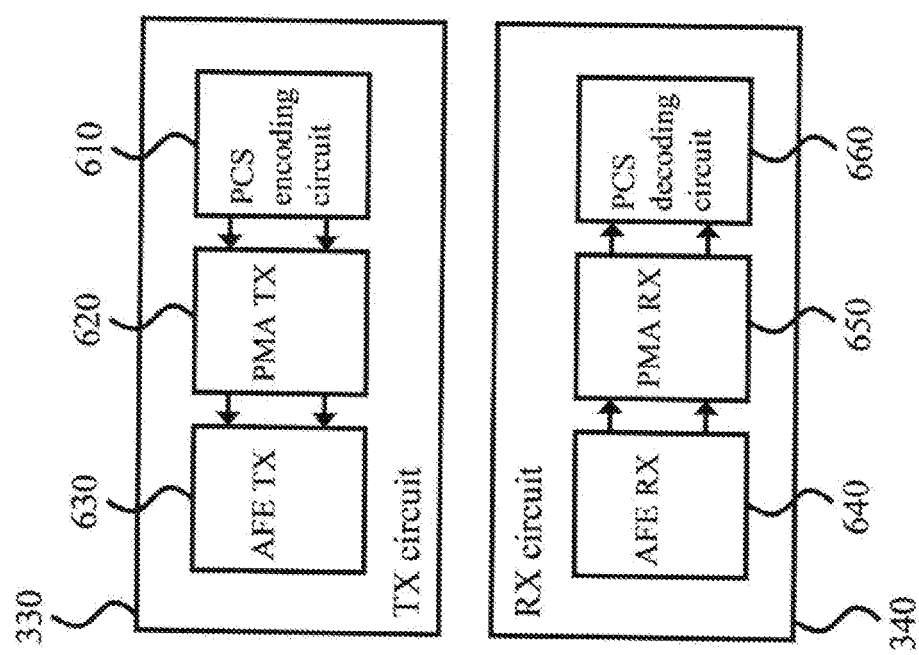
FIG. 6 illustrates an embodiment of the transmission and reception circuits of FIG. 3.

FIG. 6 illustrates an embodiment of the transmission circuit 330 and the reception circuit 340 of FIG. 3. As shown in FIG. 6, the transmission circuit 330 includes: a physical coding sub-layer (PCS) encoding circuit 610 for generating a coded signal according to the aforementioned transmission-end encryption signal in which the coded signal is a pulse amplitude modulation signal with three levels (PAM-3) in the present embodiment; a physical medium attachment transmission circuit (PMA TX) 620 for generating a digital transmission signal according to the coded signal; and an analog frond end transmission circuit (AFE TX) 630 for generating said transmission signal according to the digital transmission signal, and capable of delivering the transmission signal through one or more pairs of transmission lines 140 with a switch (not shown). Since one of ordinary skill in the art can implement the aforementioned PCS encoding circuit 610, PMA transmission circuit 620 and AFE transmission circuit 630 in light of the disclosure of this specification and the knowledge in this field, detail of these circuits is omitted for succinctness provided that the disclosure and enablement requirements remain enough. On the other side, the reception circuit 340 includes: an analog front end reception circuit (AFE RX) 640 for generating a digital reception signal according to the aforementioned reception signal, and configured with a switch (not shown) to receive the reception signal through one or more pairs of transmission lines 140 and a digital signal processor (DSP) to handle the channel effect of single or dual channels, echo, near-end crosstalk (NEXT) and far-end crosstalk, and etc.; a physical medium attachment reception circuit (PMA RX) 650 for generating a decode-awaited signal according to the digital reception signal; and a physical coding sub-layer (PCS) decoding circuit 660 for generating the aforementioned reception-end encryption signal according to the decode-awaited signal. Similarly, since one of ordinary skill in the art can implement the above-mentioned AFE reception circuit 640, PMA reception circuit 650 and PCS decoding circuit 660 in light of the disclosure of this specification and the knowledge in this field, detail of these circuits is therefore omitted.

Figure 7A:
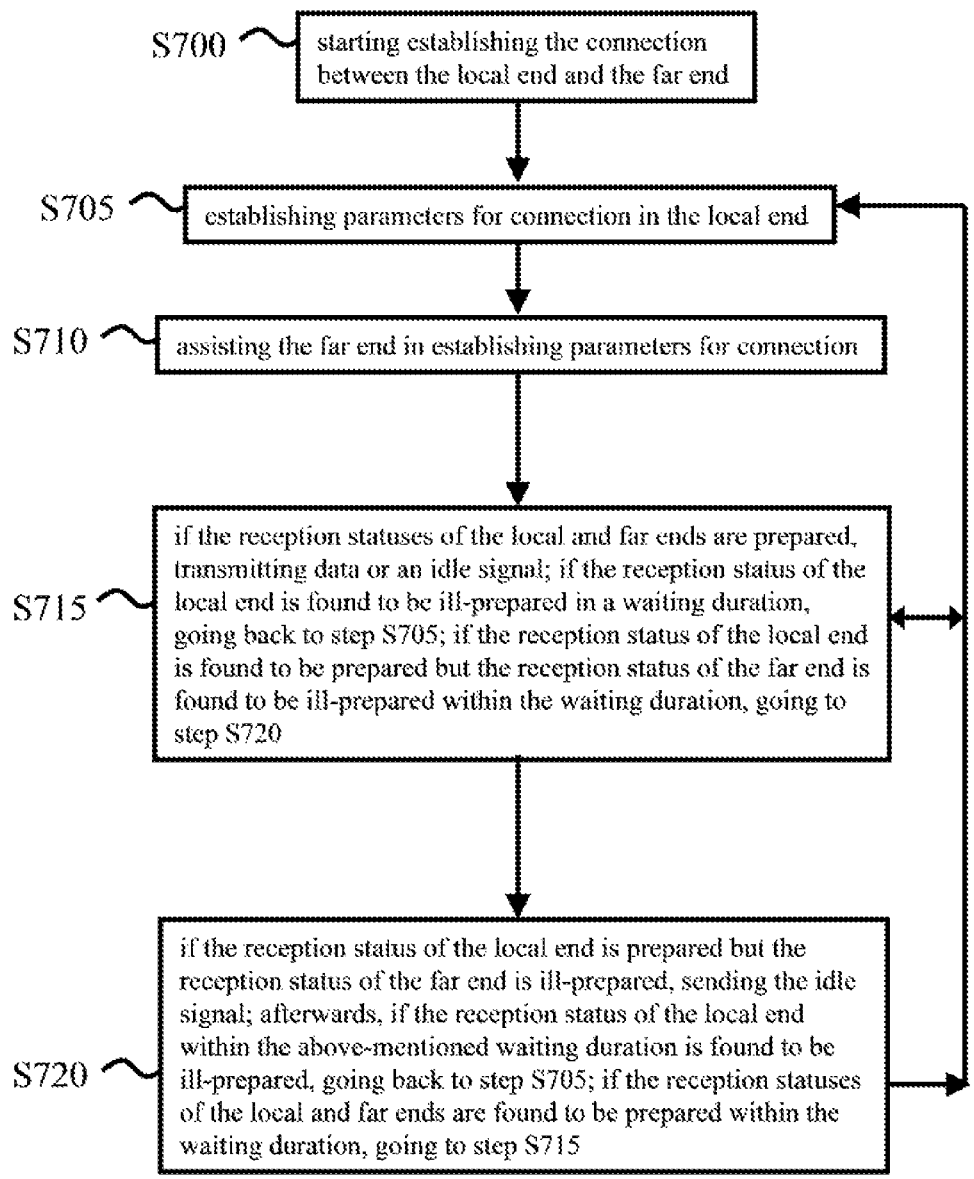
FIG. 7a and FIG. 7b illustrate an embodiment of the operation procedure of the physical layer circuit of FIG. 3.
Figure 7B:
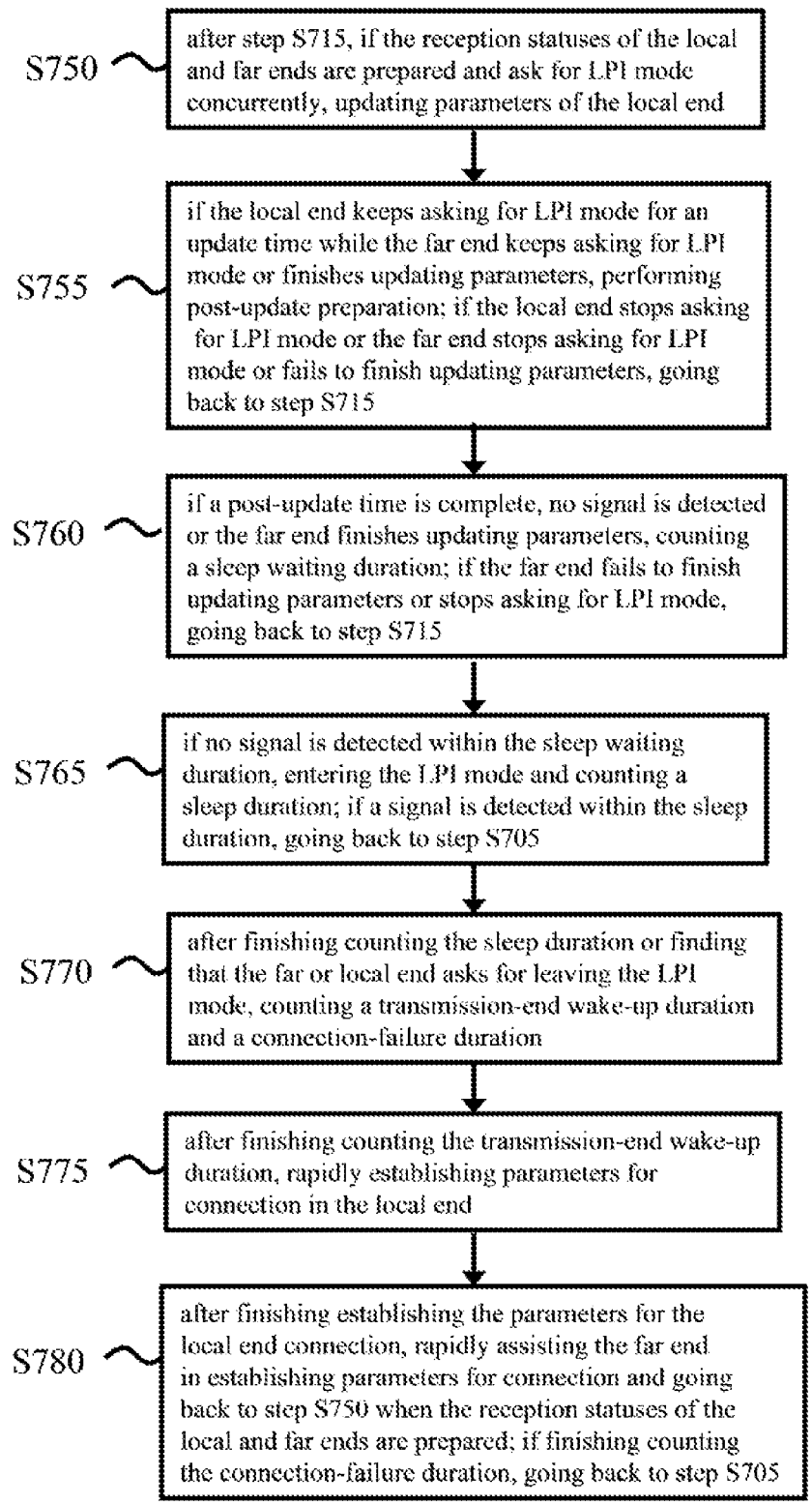

FIG. 7a and FIG. 7b illustrate an embodiment of the operation procedure of the physical layer circuit 130 of FIG. 1. FIG. 7a shows the operation procedure of the physical layer circuit 130 under the normal and idle mode; FIG. 7b shows the operation procedure of the physical layer circuit 130 entering the LPI mode from the idle mode. Please refer to FIG. 7a and the fore description, the operation procedure comprises:

Step S700: starting establishing the connection between the local end (i.e. the transmission end, a.k.a. the network communication device 100 of FIG. 1) and the far end (i.e. the reception end 150 of FIG. 1);

Step S705: establishing parameters for connection in the local end;

Step S710: assisting the far end in establishing parameters for connection;

Step S715: if the reception statuses of the local and far ends are prepared, transmitting data or an idle signal; if the reception status of the local end is found to be ill-prepared in a waiting duration, going back to step S705; if the reception status of the local end is found to be prepared but the reception status of the far end is found to be ill-prepared within the waiting duration, going to step S720; and Step S720: if the reception status of the local end is prepared but the reception status of the far end is ill-prepared, sending the idle signal; afterwards, if the reception status of the local end within the above-mentioned waiting duration is found to be ill-prepared, going back to step S705; if the reception statuses of the local and far ends are found to be prepared within the waiting duration, going to step S715.

Please refer to FIG. 7b and the fore description. The operation procedure further comprises:

Step S750: after step S715, if the reception statuses of the local and far ends are prepared and ask for LPI mode concurrently, updating parameters of the local end;

Step S755: if the local end keeps asking for LPI mode for an update time while the far end keeps asking for LPI mode or finishes updating parameters, performing post-update preparation; if the local end stops asking for LPI mode or the far end stops asking for LPI mode or fails to finish updating parameters, going back to step S715;

Step S760: if a post-update time is complete, no signal is detected or the far end finishes updating parameters, counting a sleep waiting duration; if the far end fails to finish updating parameters or stops asking for LPI mode, going back to step S715;

Step 765: if no signal is detected within the sleep waiting duration, entering the LPI mode and counting a sleep duration; if a signal is detected within the sleep duration, going back to step S705;

Step S770: after finishing counting the sleep duration or finding that the far or local end asks for leaving the LPI mode, counting a transmission-end wake-up duration and a connection-failure duration;

Step S775: after finishing counting the transmission-end wake-up duration, rapidly establishing parameters for connection in the local end; and Step S780: after finishing establishing the parameters for the local end connection, rapidly assisting the far end in establishing parameters for connection and going back to step S750 when the reception statuses of the local and far ends are prepared; if finishing counting the above-mentioned connection-failure duration (which means that no connection is built within that duration), going back to step S705.

Please note that the above-described operation procedures are for understanding, not for limiting the scope of the present invention. People of ordinary skill in the art can modify the procedure according to the disclosure of this specification and/or their demand or design rules with due diligence. For instance: one can add decision terms to any of the steps to thereby modify the execution timing of said step, modify parameters taken by any of the steps to therefore adjust the execution effect of such step, eliminate any of the steps if such step is useless, or set new conditions to change the relation between the steps. In brief, the physical layer circuit 130 can carry out equivalent or modified steps derived from the fore-mentioned operation procedures. Please also note that steps of each of the embodiments in this specification are not confined to a specific execution order provided that such steps themselves do not need the execution order.

Figure 8:
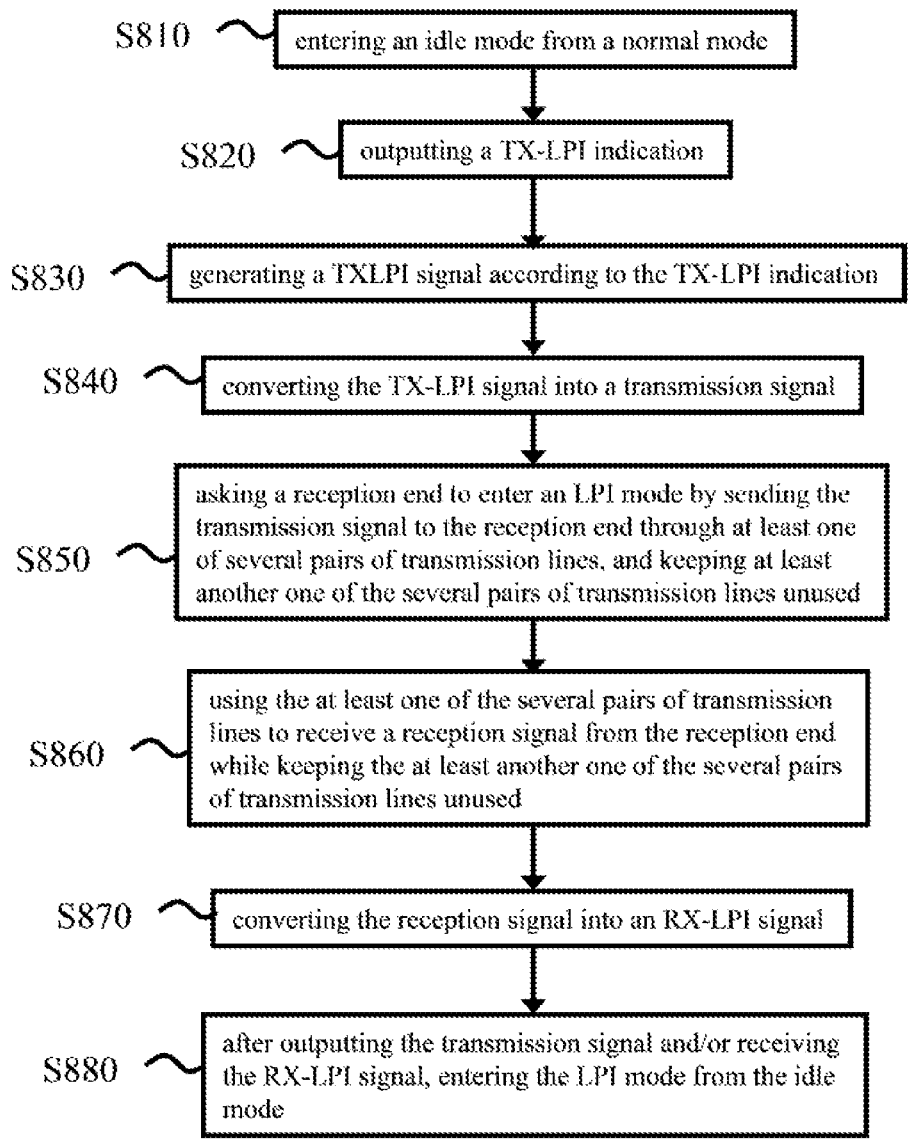
FIG. 8 illustrates an embodiment of the energy efficient network communication method of the present invention.

In addition to the above-disclosed network communication device 100, the present invention provides an energy efficient network communication method which can be carried out by the network communication device 100 or the equivalent device thereof. Please refer to FIG. 8; an embodiment of the network communication method comprises the following steps:

Step S810: entering an idle mode from a normal mode. In this embodiment, the normal and idle modes comply with IEEE Ethernet network standard;

Step S820: outputting a transmission-end low power idle indication (i.e. TX-LPI indication);

Step S830: generating a transmission-end low power idle signal (i.e. TX-LPI signal) according to the TX-LPI indication;

Step S840: converting the TX-LPI signal into a transmission signal;

Step S850: asking a reception end to enter a low power idle mode (i.e. LPI mode) by sending the transmission signal to the reception end through at least one of several pairs of transmission lines, and keeping at least another one of the several pairs of transmission lines unused;

Step S860: using the at least one of the several pairs of transmission lines to receive a reception signal from the reception end while keeping the at least another one of the several pairs of transmission lines unused;

Step S870: converting the reception signal into a reception-end low power idle signal (i.e. RX-LPI signal); and Step S880: after outputting the transmission signal and/or receiving the RX-LPI signal, entering the LPI mode from the idle mode, so as to stop the operation of some circuits of the device executing the present method for power saving, wherein the power consumption under the normal mode is higher than that under the idle mode while the power consumption under the idle mode is higher than that under the LPI mode.

The above-described method can further comprises the following steps: outputting a low power idle stop indication (LPI stop indication); asking the reception end to leave the LPI mode by sending a wake-up signal to it according to the LPI stop indication; and after issuing the wake-up signal and/or finding that the reception end itself asks for leaving the LPI mode, quitting the LPI mode.

Please note that one can find more explanation of the TX-LPI and RX-LPI signals from the fore-disclosed embodiments. Besides, in the above-mentioned steps, the step of converting the TX-LPI signal into the transmission signal includes: generating a transmission-bit conversion signal according to the TX-LPI signal in which the bit number of the TX-LPI signal is different from the bit number of the transmission-bit conversion signal; generating a transmission-end encryption signal according to the transmission-bit conversion signal; and generating the transmission signal according to the transmission-end encryption signal. On the other side, the step of converting the reception signal into the RX-LPI signal includes: generating a reception-end encryption signal according to the reception signal; generating a reception-bit conversion signal according to the reception-end encryption signal; and generating the RX-LPI signal according to the reception-bit conversion signal whose bit number is different from the bit number of the RX-LPI signal. Moreover, the step of generating the transmission-end encryption signal includes: generating a plurality of transmission-end encryption bits according to the transmission-bit conversion signal; and performing a logic operation with at least some of the transmission-end encryption bits to thereby generate the transmission-end encryption signal, wherein an example of the logic operation is an Exclusive-OR operation. Furthermore, the step of generating the reception-bit conversion signal includes: generating a plurality of reception-end encryption bits according to the reception-end encryption signal; and performing a comparison operation with at least some of the reception-end encryption bits to thereby generate the reception-bit conversion signal. As to the step of outputting the TX-LPI indication, it can include: outputting the TX-LPI indication in light of a buffer capacity threshold.

Since one of ordinary skill in the art can appreciate detail and modification of this method invention by referring to the fore-disclosed device invention, redundant and unnecessary description is therefore omitted.

To sum up, the energy efficient network communication device and method are capable of utilizing some of several pairs of transmission lines (e.g. one or two pairs among four pairs of transmission lines) for transmission and reception when keeping the others of the several pairs of transmission lines (e.g. the other three or two pairs among the four pairs of transmission lines) unused, and capable of entering the LPI mode under an appropriate condition for power saving. Besides, the present invention uses undefined parameters combination (e.g. the combination of the aforementioned transmission bits) in comparison with the prior art and a simple logic operation (e.g. an Exclusive-OR operation) for carrying the information of the LPI mode, and uses a comparison operation (e.g. an inversion operation plus a comparison operation) to determine whether a received signal contains the information of the LPI mode, so that the power saving effect can be realized without changing the circuit design and connection procedure significantly. Furthermore, by installing the aforementioned transmission buffer to provide the TX-LPI indication, the present invention can make use of a media access control circuit in compliance with 100 BASE-T which can not issue the TX-LPI indication on its own, and thereby simplifies the whole design.

The aforementioned descriptions represent merely the preferred embodiment of the present invention, without any intention to limit the scope of the present invention thereto. Various equivalent changes, alterations, or modifications based on the claims of present invention are all consequently viewed as being embraced by the scope of the present invention.

What is claimed is:

1. An energy efficient network communication device, comprising:
   a media access controller for outputting a transmission-end low power idle indication (TX-LPI indication) and receiving a reception-end low power idle indication (RX-LPI indication), including:
      a media access control circuit coupled to a media independent reception interface; and
      a transmission buffer, coupled between the media access control circuit and a media independent transmission interface, for outputting the TX-LPI indication according to a buffer capacity threshold after the media access control circuit stops sending packets;
   a media independent interface including: the media independent transmission interface for generating a transmission-end low power idle signal (TX-LPI signal)

according to the TX-LPI indication; and the media independent reception interface for generating the RX-LPI indication according to a reception-end low power idle signal (RX-LPI signal); and a physical layer circuit, electrically coupled to the media independent interface and several pairs of transmission lines, including:

a physical layer transmission circuit, coupled to the media independent transmission interface, for converting the TX-LPI signal into a transmission signal and sending the transmission signal to a reception end to ask the reception end to enter a low power idle mode (LPI mode); and a physical layer reception circuit, coupled to the media independent reception interface, for receiving a reception signal from the reception end and converting the reception signal into the RX-LPI signal, wherein the physical layer circuit uses at least one of the several pairs of transmission lines to send the transmission signal and receive the reception signal, and keeps at least another one of the several pairs of transmission lines unused, and after sending the transmission signal and/or receiving the RX-LPI signal, the physical layer circuit enters the LPI mode from an idle mode and stops the operation of some or all of the physical layer circuit to reduce power consumption.

2. The energy efficient network communication device of claim 1, wherein the TX-LPI signal includes a first transmission bit, a second transmission bit and a third transmission bit in which the first transmission bit has a first predetermined value, the second transmission bit has a second predetermined value and the third transmission bit has a third predetermined value, and the RX-LPI signal includes a first reception bit, a second reception bit and a third reception bit in which the first reception bit corresponds to the first predetermined value, the second reception bit corresponds to the second predetermined value and the third reception bit corresponds to the third predetermined value.

3. The energy efficient network communication device of claim 1, wherein the physical layer transmission circuit includes:

a transmission-bit conversion circuit, coupled to the media independent transmission interface, for generating a transmission-bit conversion signal according to the TX-LPI signal in which the bit number of the TX-LPI signal is different from the bit number of the transmission-bit conversion signal;

an encryption circuit, coupled to the transmission-bit conversion circuit, for generating a transmission-end encryption signal according to the transmission-bit conversion signal; and a transmission circuit, electrically coupled to the several pairs of transmission lines, for generating the transmission signal according to the transmission-end encryption signal.

4. The energy efficient network communication device of claim 3, wherein the encryption circuit generates a plurality of transmission-end encryption bits according to the transmission-bit conversion signal, and performs a logic operation with at least some of the transmission-end encryption bits to thereby generate the transmission-end encryption signal.

5. The energy efficient network communication device of claim 4, wherein the plurality of transmission-end encryption bits includes a first transmission-end encryption bit, a second transmission-end encryption bit and a third transmission-end encryption bit in which the first transmission-end encryption bit represents the TX-LPI indication, the second transmission-end encryption bit represents a transmission-end update-completion indication and the third transmission-end encryption bit represents a transmission-end reception status.

6. The energy efficient network communication device of claim 4, wherein the logic operation is an Exclusive-OR operation.

7. The energy efficient network communication device of claim 3, wherein the transmission circuit includes:

a physical coding sub-layer encoding circuit for generating a coded signal in accordance with the transmission-end encryption signal;

a physical medium attachment transmission circuit for generating a digital transmission signal according to the coded signal; and an analog front end transmission circuit for generating the transmission signal according to the digital transmission signal.

8. The energy efficient network communication device of claim 1, wherein the physical layer reception circuit includes:

a reception circuit, electrically connected to the several pairs of transmission lines, for generating a reception-end encryption signal according to the reception signal;

a decryption circuit, coupled to the reception circuit, for generating a reception-bit conversion signal according to the reception-end encryption signal; and a reception-bit conversion circuit, coupled to the decryption circuit and the medium independent reception interface, for generating the RX-LPI signal according to the reception-bit conversion signal in which the bit number of the RX-LPI signal is different from the bit number of the reception-bit conversion signal.

9. The energy efficient network communication device of claim 8, wherein the decryption circuit includes:

a first decryption sequence generation circuit for providing a first decryption sequence according to the reception-end encryption signal in which the first decryption sequence is used as the basis of generating the reception-bit conversion signal and includes a first preset bit;

a first decryption verification circuit for generating a decryption verification signal according to a first reception-end encryption bit of the reception-end encryption signal and the first preset bit;

a second decryption verification circuit for generating the decryption verification signal according to the reversed bit of the first reception-end encryption bit and a first preset operation-bit; and a second decryption sequence generation circuit for providing a second decryption sequence as the basis of generating the reception-bit conversion signal in which the second decryption sequence includes the first preset operation-bit.

10. The energy efficient network communication device of claim 8, wherein the decryption circuit generates a plurality of reception-end encryption bits and performs a comparison operation with at least some of the plurality of reception-end encryption bits to thereby generate the reception-bit conversion signal.

11. The energy efficient network communication device of claim 10, wherein the decryption circuit checks whether a decryption sequence of the decryption circuit is synchronous with an encryption sequence of the reception end by the comparison operation, and determines whether the reception end asks for the low power idle mode.

12. The energy efficient network communication device of claim 8, wherein the reception circuit includes:

an analog front end reception circuit for generating a digital reception signal according to the reception signal;

a physical medium attachment reception circuit for generating a decode-awaited signal according to the digital reception signal; and a physical coding sub-layer decoding circuit for generating the reception-end encryption signal according to the decode-awaited signal.

13. The energy efficient network communication device of claim 1, wherein if the media access controller is going to send packets, it sends a low power idle stop indication (LPI stop indication) to the physical layer circuit; and the physical layer circuit asks the reception end to leave the LPI mode by sending a wake-up signal to the reception end according to the LPI stop indication, and leaves the LPI mode after receiving the LPI stop indication and/or ascertaining that the reception end asks for leaving the LPI mode.

14. The energy efficient network communication device of claim 1, wherein the transmission buffer includes:

a storage unit for storing delivery-awaited packets;

a buffer capacity monitoring unit for watching the capacity of the storage unit according to the buffer capacity threshold, and issuing a notification signal if the capacity of the storage unit reaches the buffer capacity threshold; and a low power idle indication generation unit for sending the TX-LPI indication according to the notification signal.

15. The energy efficient network communication device of claim 14, wherein after the media access control circuit starts sending packets, the transmission buffer outputting a low power idle stop indication (LPI stop indication) to the physical layer circuit through the media independent transmission interface in accordance with the buffer capacity threshold; and the physical layer circuit asks the reception end to leave the LPI mode by sending a wake-up signal according to the LPI stop indication, and quits the LPI mode after receiving the LPI stop indication and/or ascertaining that the reception end asks for leaving the LPI mode.

16. The energy efficient network communication device of claim 1, which enters the idle mode from a normal mode before sending the LPI indication, wherein the power consumption under the normal mode is higher than the power consumption under the idle mode while the power consumption under the idle mode is higher than the power consumption under the LPI mode.

17. An energy efficient network communication method, which is carried out by an energy efficient network communication device, comprising:

entering an idle mode from a normal mode;

generating a transmission-end lower power idle indication (TX-LPI indication);

generating a transmission-end lower power idle signal (TX-LPI signal) according to the TX-LPI indication;

converting the TX-LPI signal into a transmission signal with at least the following sub-steps:

generating a transmission-bit conversion signal according to the TX-LPI signal in which the bit number of the TX-LPI signal is different from the bit number of the transmission-bit conversion signal;

generating a plurality of transmission-end encryption bits according to the transmission-bit conversion signal and performing a logic operation with at least some of the transmission-end encryption bits to generate a transmission-end encryption signal; and generating the transmission signal according to the transmission-end encryption signal;

using at least one of several pairs of transmission lines to output the transmission signal to a reception end for asking the reception end to enter a lower power idle mode (LPI mode) when keeping at least another one of the several pairs of transmission lines unused;

using the at least one of the several pairs of transmission lines to receive a reception signal from the reception end when keeping the at least another one of the several pairs of transmission lines unused;

converting the reception signal into a reception-end low power idle signal (RX-LPI signal) with at least the following sub-steps:

generating a reception-end encryption signal according to the reception signal;

generating a plurality of reception-end encryption bits according to the reception-end encryption signal and performing a comparison operation with at least some of the reception-end encryption bits to generate a reception-bit conversion signal; and generating the RX-LPI signal according to the reception-bit conversion signal in which the bit number of the RX-LPI signal is different from the bit number of the reception-bit conversion signal; and after outputting the transmission signal and/or receiving the RX-LPI signal, entering the LPI mode from the idle mode for power saving, wherein the power consumption under the normal mode is higher than the power consumption under the idle mode while the power consumption under the idle mode is higher than the power consumption under the LPI mode.

18. The energy efficient network communication method of claim 17, wherein the TX-LPI signal includes a first transmission bit, a second transmission bit and a third transmission bit in which the first, second and third transmission bits respectively have a first predetermined value, a second predetermined value and a third predetermined value; and the RX-LPI signal includes a first reception bit, a second reception bit and a third reception bit in which the first, second and third reception bits respectively correspond to the first, second and third predetermined values.

19. The energy efficient network communication method of claim 17, wherein the logic operation is an Exclusive-OR operation.

20. The energy efficient network communication method of claim 17, further comprising:

generating a low power idle stop indication (LPI stop indication);

asking the reception end to leave the LPI mode by sending a wake-up signal according to the LPI stop indication; and leaving the LPI mode in accordance with the LPI stop indication and/or a signal from the reception end asking for leaving the LPI mode.

21. The energy efficient network communication method of claim 17, wherein the step of generating the TX-LPI indication includes: generating the TX-LPI indication according to a buffer capacity threshold.

* * * * *